Figure 2:
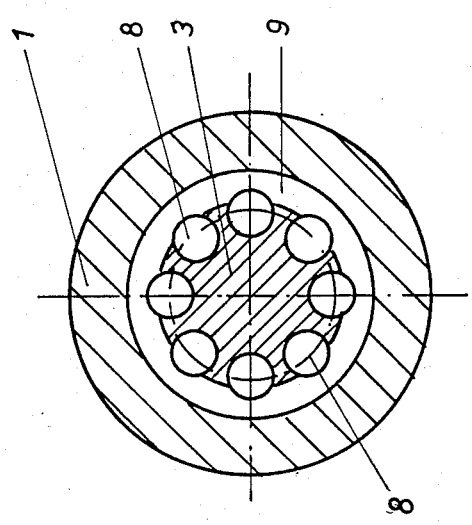

United States Patent [19]

Küster et al.

[11] Patent Number: 4,660,595

[45] Date of Patent: Apr. 28, 1987

[54] PRESSURE-LIMITING VALVE

[75] Inventors: Willi Küster; Karl Krieger, both of Wuppertal; Werner Reinelt, Bochum, all of Fed. Rep. of Germany

[73] Assignee: Hermann Hemscheidt Maschinenfabrik GmbH & Co., Wuppertal, Fed. Rep. of Germany

[21] Appl. No.: 765,233

[22] Filed: Aug. 13, 1985

[30] Foreign Application Priority Data

Aug. 31, 1984 [DE] Fed. Rep. of Germany ....... 3432007

[51] Int. Cl.$^4$ ............................................. F16K 15/06
[52] U.S. Cl. .................................... 137/494; 137/538; 137/625.38; 251/900
[58] Field of Search ...................... 137/494, 512.1, 538, 137/625.38; 251/900

[56] References Cited

U.S. PATENT DOCUMENTS

| 1,108,950 | 9/1914 | Viger | 137/625.38 |
| 2,616,445 | 11/1952 | Gaddoni | 137/538 X |
| 3,338,263 | 8/1967 | Altmeppen et al. | 137/494 X |
| 4,171,712 | 10/1979 | DeForrest | 137/538 X |
| 4,284,101 | 8/1981 | Weirich | 137/538 |
| 4,313,463 | 2/1982 | Weirich | 137/538 |

Primary Examiner—Martin P. Schwadron
Assistant Examiner—Stephen M. Hepperle
Attorney, Agent, or Firm—Berman, Aisenberg & Platt

[57] ABSTRACT

A pressure-limiting valve comprises a cylindrical actuator piston guided displaceably in a bore and held under the pressure of a spring in the closure position of the valve. Longitudinally-directed throughflow passages are formed in the actuator piston on the pressure-loaded end and are arranged concentrically with respect to the central axis and open into an annular groove extending around and in the circumferential surface of the actuator piston. This groove is sealed off by a gasket mounted in the bore wall. When the set pressure predetermined by the closure spring is exceeded, the actuator piston travels with the gasket over the annular groove so that the pressure medium can flow away through the outlet opening.

1 Claim, 2 Drawing Figures

PRESSURE-LIMITING VALVE

This invention relates to a pressure-limiting valve for an hydraulic longwall mine roof support system having a cylindrical actuator piston guided displaceably against a spring within a longitudinal bore of a valve housing, which piston comprises at least one axial throughflow passage on the side charged with the supplied pressure medium and an annular groove connected therewith and extending around and in the circumferential surface of the actuator piston, which groove is sealed off from an outlet opening in the valve housing by a gasket surrounding the actuator piston when the valve is in the closed position, and which piston on exceeding of the set pressure predetermined by the spring is displaceable with the annular groove over the gasket into the open position.

According to the prior art, it is known for pressure-limiting valves to have a spring-loaded actuator piston which, when a predetermined set pressure is exceeded, travels with the throughflow passages arranged in the actuator piston over a gasket mounted in the valve housing. For example, in the pressure-limiting valve described in French Patent Specification No. 1,149,799, grooves extending in the axial direction are formed in the circumferential surface of the actuator piston as throughflow passages through which the pressure medium flows away to the outlet opening in the open position. The high working pressure in hydraulic, longwall mine roof support systems results however in very high outflow speeds. The pressure medium flowing away transversely of the circumference of the gasket in a short time causes erosion of and damage to the gasket which, as a rule, is cut by the edges of the grooves and thus destroyed.

In order to avoid damage of this kind, German Patent Specification No. 1,303,157 proposes an actuator piston for a pressure-limiting valve having a central axial bore from which radial bores branch and which open into a wide and shallow annular groove in the cylindrical circumferential surface of the actuator piston. In this way the flow resistance on the outflow side is said to be reduced on opening of the valve by the same extent to which the outflow cross-section increases. In the open position of this pressure-limiting valve the actuator piston is situated with the shallow annular groove over the gasket, while the pressure fluid flows away likewise at high speed through the narrow gap beneath the gasket. Due to the suction effect of the fluid streams, the gasket, which no longer abuts on the actuator piston, is at least partially washed out of the reception groove in the housing wall and pressed against the edge of the groove, so that the destruction of the gasket is unavoidable in this construction also. There is also the fact that the throughflow cross-section of the valve, determining the speed of flow, is limited by the number of the radial bores and by their cross-section. Moreover the production of the radial bores is expensive.

The present invention aims to provide a pressure-limiting valve wherein the throughflow quantity of fluid is increased, the life of the gasket is lengthened and the production costs are reduced. With this aim in view, the invention is directed to a pressure-limiting valve of the construction stated in the opening paragraph of the specification wherein the annular groove is made narrower than the width of the gasket, and longitudinal through-flow passages opening into the groove are arranged in the actuator piston concentrically with respect to the longitudinal axis of the piston.

The pressure fluid flowing in through the throughflow passages when the valve is in the open position is distributed in the annular groove and loads the gasket uniformly over the entire circumference and presses it into the reception groove so that damage to the gasket by the passage of the pressure medium flowing out of the actuator piston is precluded. In comparison with a conventional pressure-limiting valve having an axial central bore and radial bores issuing therefrom, the pressure-limiting valve according to the present invention has a throughflow cross-section which is larger for the same installation dimensions, although the number of the bores formed in the actuator piston is substantially smaller. The introduction of the bores for the throughflow passages from the end of the actuator piston is simpler in production technique than distributing them over the circumference of the circumferential surface. With the larger throughflow cross-section, the flow speed of the pressure medium is reduced and the danger of erosion damage is further diminished.

Figure 1:
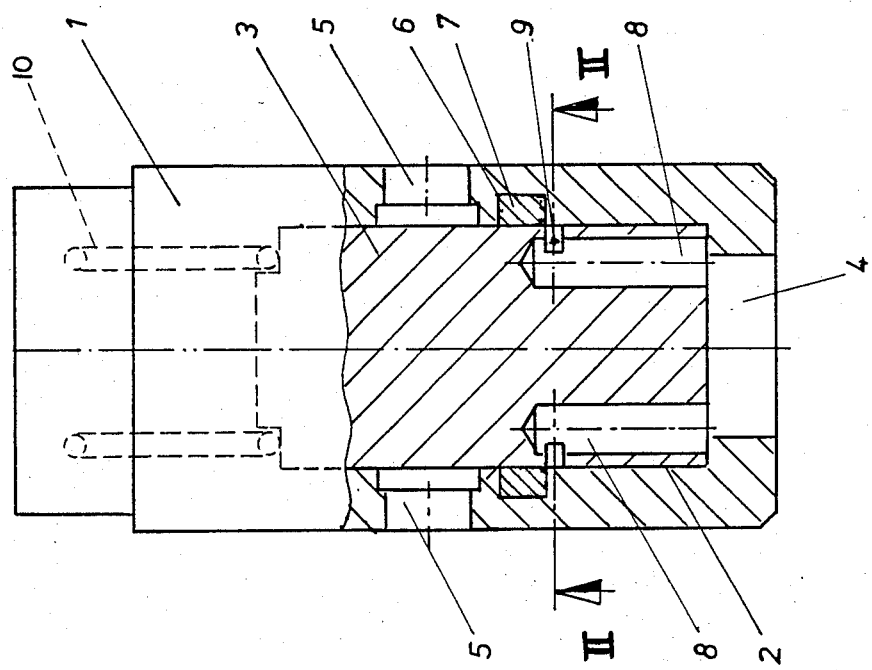

An example of a pressure-limiting valve in accordance with the invention is shown in the accompanying drawings, wherein:

FIG. 1 shows the pressure-limiting valve in elevation with a longitudinal section in the lower region; and FIG. 2 shows a cross-section through the pressure-limiting valve taken on the line II—II in FIG. 1.

The illustrated valve comprises a housing 1 in which an actuator piston 3 is guided displaceably in a longitudinal bore 2. A closure spring 10 is accommodated in the upper region of the housing. By way of example, an initially-compressed gas or a mechanical spring can be used as a closure spring, the set pressure of the valve being predetermined by the closure force of the spring. The closure spring holds the actuator piston 3 of the pressure-limiting valve in the illustrated closing position in which the passage of the pressure medium to the outlet openings 5 is blocked against the pressure medium present on the entry opening 4 of the valve housing 1. A reception groove 6 for the gasket 7 which encloses the actuator piston 3 in a sealing manner is situated in the wall of the longitudinal bore 2—beneath the outlet openings 5 in the elevation as shown.

As throughflow passages there are a series of longitudinally-directed blind bores 8 which are formed in the actuator piston 3 from the end lying opposite to the closure spring and facing the entry opening 4. The throughflow passages 8 are arranged concentrically with respect to the central axis of the actuator piston and open into a narrow, deep, annular groove 9 which extends around and in the circumferential surface of the actuator piston 3 and is situated beneath the gasket 7 when the valve is in the closed position. The width of the annular groove 9 is less than the width of the gasket 7 mounted in the reception groove 6.

The pressure medium present in the throughflow passages 8 and in the annular groove 9 from the entry opening 4 of the pressure-limiting valve pushes the actuator piston into the open position when the pressure exceeds the set pressure predetermined by the closure spring. The actuator piston 3 shifts under the action of the pressure of the direction of the outlet openings 5 and the annular groove 9 travels over the gasket 7. The presssure medium present in the annular groove 9 presses the gasket 7 into the reception groove 6. The outflow of the pressure medium into the outlet openings 5 of the valve commences only when the narrow annular groove 9 of the actuator piston 3 has travelled entirely over the wider gasket 7. A wide outflow cross-section is kept open when the valve is in the open position.

We claim:

1. A hydraulic pressure-limiting valve for an hydraulic longwall mine roof support system comprising: a valve housing with a longitudinal bore therein, a fluid entry opening and a fluid discharge opening in the valve housing, a cylindrical actuator piston arranged for guided axial displacement within said bore, a spring within said bore serving to urge said piston towards one end of the bore, a plurality of blind bores in said piston disposed in a circle concentrically of the longitudinal axis of the piston and leading from that end of the piston remote from the spring, the said piston end being subjected to the direct pressure of hydraulic fluid entering the valve housing through said fluid entry opening therein, an annular groove extending around in the circumferential surface of the actuator piston and breaking into the blind end regions of said blind bores, an annular fluid-sealing gasket located in an annular groove in the bore of the valve housing and disposed between said entry and discharge openings, said gasket surrounding the actuator piston and sealing off the annular groove therein from the fluid discharge opening in the valve housing when the piston is in a first position nearer the said one end of the housing bore under the pressure of the spring, said piston annular groove being narrower axially of the piston than the width of the gasket axially of the housing bore, said gasket being uniformly pressed into the annular groove in the bore of the valve housing by the pressure of fluid in said piston annular groove when said piston moves into a second position away from said one end of the housing bore.

* * * * *